(No Model.) 2 Sheets—Sheet 1.
E. P. THOMPSON.
APPARATUS FOR THE SEPARATION OF GOLD FROM ITS ORES BY CHLORINATION.
No. 323,755. Patented Aug. 4, 1885.
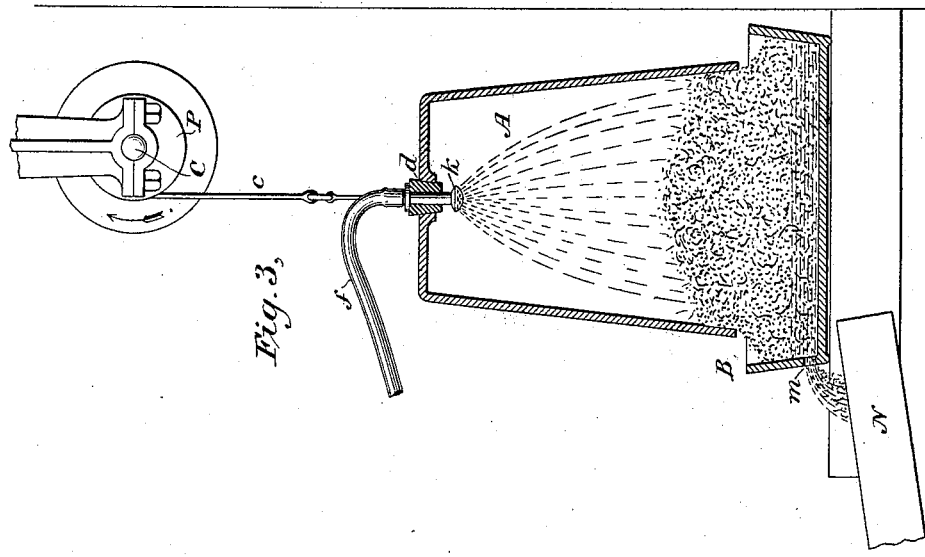
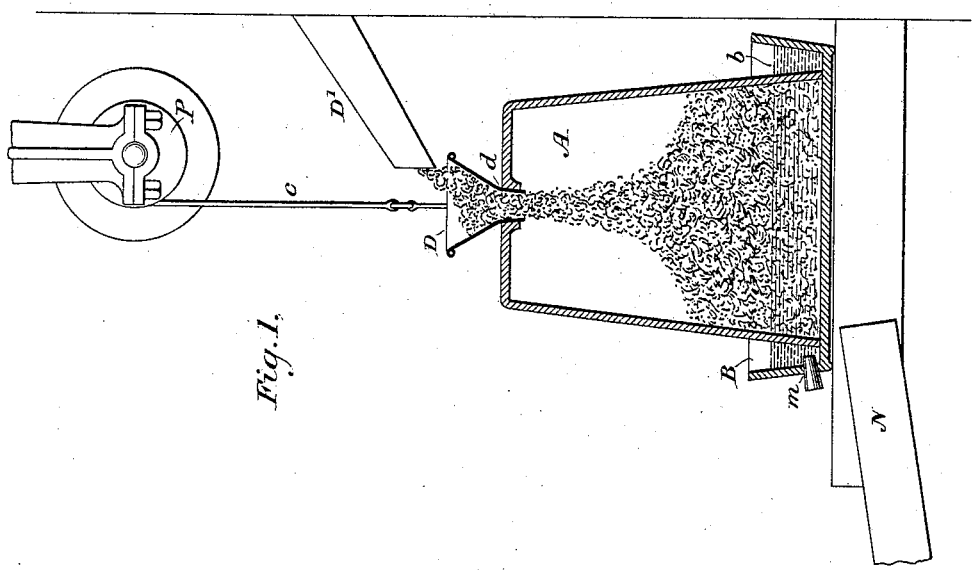
WITNESSES
Wm. A. Skinkle
Geo. W. Breck
INVENTOR
Edward P. Thompson,
By his Attorneys
Pope Edgecomb & Butler

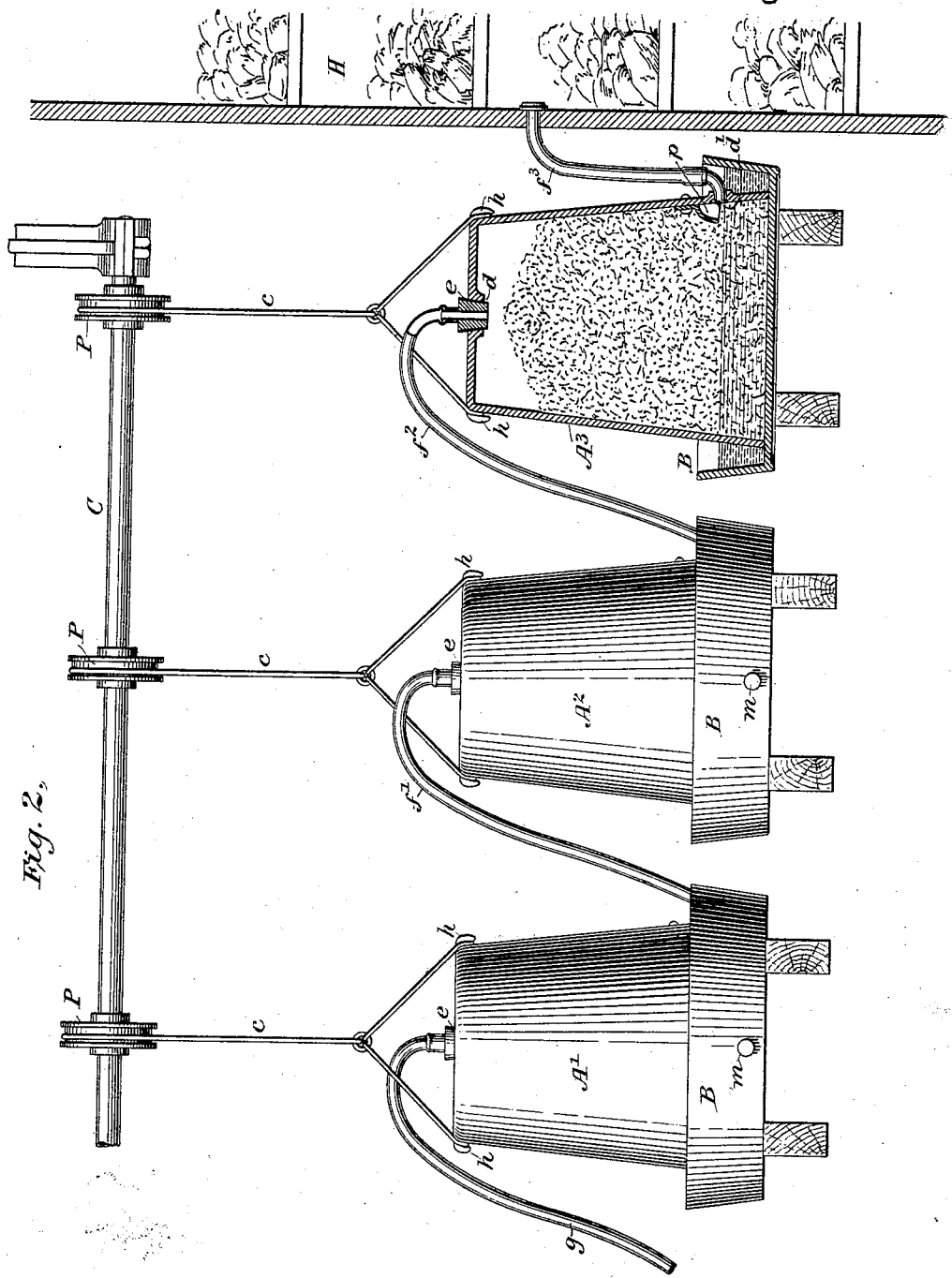

UNITED STATES PATENT OFFICE.

EDWARD P. THOMPSON, OF ELIZABETH, NEW JERSEY, ASSIGNOR OF THREE-FOURTHS TO EDWARD P. ROBERTS AND G. H. PIERCE, BOTH OF CHEYENNE, WYOMING TERRITORY.

APPARATUS FOR THE SEPARATION OF GOLD FROM ITS ORES BY CHLORINATION.

SPECIFICATION forming part of Letters Patent No. 323,755, dated August 4, 1885.

Application filed January 29, 1884. (No model.)

*To all whom it may concern:*

Be it known that I, EDWARD P. THOMPSON, a citizen of the United States, residing in Elizabeth, in the county of Union and State of New Jersey, have invented certain new and useful Improvements in Apparatus for the Separation of Gold from its Ores by Chlorination, of which the following is a specification.

One of the most efficient methods of separating gold from its ores, or from any of the ordinary compounds of gold, is by the use of chlorine, the affinity of these two elements for each other being such that they readily unite whenever they are brought together, forming thereby chloride of gold.

The object of this invention is to provide means for an efficient, rapid, and economic conversion of gold into an aqueous solution of its chloride. There are many ways by which free chlorine may be obtained from its various compounds; but this invention has reference only to the use of that element, however obtained, for the purposes set forth.

The invention consists in apparatus for exposing the ore containing gold, or any other compounds of that metal, in a properly-divided state, to the action of chlorine gas, forming thereby the chloride of gold, and then saturating the same with water, thereby forming an aqueous solution of the chloride. In carrying out the invention a series of vats of a suitable size are provided, which can be made air-tight after the crushed ore or other compound has been introduced into them. Chlorine is then forced into these vats in succession by means of properly-connected pipes until all are filled. The excess, if any, of the gas is then allowed to enter a chamber, where it is utilized for other purposes, and also after the ore has been changed into the chloride of gold the gas remaining in the vats is forced into the above-named chamber and used, as already stated. After as much of the gold in the vats has united with the chlorine as will do so, then through the same opening that admitted the gas a pipe is introduced, so fitted that water in a fine spray is thrown over the mass and is allowed to percolate through it. This dissolves the chloride of gold already formed. The solution may then be drawn off into suitable vessels, wherein the two elements may be separated in any manner that may be desired.

The invention will be fully explained and illustrated by reference to the accompanying drawings, in which Figure 1 is an elevation and section of one of the vats and connected apparatus, showing the way in which the crushed ore is introduced. Fig. 2 shows a series of three vats, partly in section, illustrating the manner in which the chlorine is introduced in succession from one to the other, and from the last vat of the series into a chamber, where it may be utilized for other purposes. Fig. 3 is a view of one of the vats with the water-pipe inserted, showing the manner in which a spray is thrown upon the mass of ore, so as to form the aqueous solution after the chlorination has been effected.

Referring now to Fig. 1, A represents an ordinary vat—such as is used in gold-works—and B represents a shallow tub, in diameter something larger than the diameter of the larger end of the vat. The vat and tub are both preferably made of wood covered with asphaltum, or simply soaked in brine, or rubbed with oil, so as to prevent the gold from depositing upon the wood. On each side of the top of the vat A is a lug or hook, $h$, (better seen in Fig. 2,) by means of which the vat may be suspended and raised or lowered by the pulley P and the cord $c$. Several of these vats are designed to be placed in series, and each is provided with the cord $c$ and drum P for raising the same. The drums are supported upon a shaft, C, which is provided with any suitable means for revolving it, and thus lifting the vats. At the upper end of each vat is formed an aperture, $d$, through which the finely-divided ore may be first placed in the vat. The method of so doing is illustrated in Fig. 1, a suitable hopper or funnel, D, being placed within the opening, to which the ore is conducted from a suitable platform by means of the trough D'. When the vats have been filled to the required extent with the ore, a quantity of water is placed in the large tub B, as shown at $b$, of sufficient depth to prevent any escape of ore or gas through the bottom of the vat. The openings $d$ are then fitted with nozzles $e$, in place of the funnels employed for filling the vats, and from each of these nozzles tubes or pipes *f* are led to the succeeding vat. The tubes *f* preferably enter the succeeding vats through suitable openings, *d'*, at or near the lower extremities of the same, and the chlorine is supplied from a suitable source through a tube, *g*, to the first vat of the series. It then passes downward through the ore, and, uniting with the gold, forms a chloride. The openings *d'*, through which the tubes *f* enter the vats, are preferably protected by the shields or roofs *p*, which project from the inner surface of the vats downwardly and over the end of the tubes *f*. These shields prevent the finely-divided ore from filling the mouth of the tubes *f*, and thus preventing the free exit of the gas.

As the gas enters the upper portion of the vats, the air, which is lighter than the chlorine, is rapidly driven before it and out of the vats through the tubes *f*, and into and through the succeeding vats, until the air in all the vats has been displaced by the chlorine. The gas from the first vat, $A'$, passes through the tube *f'* to the top of the next succeeding vat, $A^2$, and then in like manner will be passed to the vat $A^3$, in each instance forming the chloride of gold to an extent depending upon the amount of gold in the ore. After as great a quantity of chlorine as it is possible to combine with the gold has been furnished thereto the excess is led from the last vat of the series through a tube, $f^3$, to any suitable chamber, where it may be collected and utilized for any desirable purpose—as, for example, the chamber H (shown in Fig. 2) may be arranged with suitable shelves, upon which lime is placed, and the union with this substance of the chlorine produces the powder used for bleaching purposes. After the maximum amount of chloride of gold has been formed in this manner, which is found in practice to require from fifteen to twenty hours, the supply-pipe *g* is disconnected from the source of chlorine and connected with any suitable means for forcing air at suitable pressure through the vats, and the chlorine which remains therein will thus be forced entirely out of the vats into the chamber H and its place in the vats supplanted by the air.

The next step in the process is to remove the connecting-tubes *f* from between the vats, and to force a quantity of water into the upper portion of each vat and cause it to percolate through the mass of ore contained therein, thereby dissolving the chloride of gold which has been formed, and which clings to the remaining parts of the ore. It is found to facilitate this step of the process to raise the vats a slight distance before introducing the water, thus allowing the mass of ore to fall loosely into the tub. A sprinkling-nozzle, *k*, (see Fig. 3,) is applied to the end of the tube *f*, leading through the opening *d*, and through this water may be forced in any suitable manner. This will flow over the entire mass of ore and dissolve the chloride in the manner specified, and cause it to descend in an aqueous solution to the bottom of the vat. Each tub B is preferably provided with an opening or spout, *m*, through which the water and the dissolved chloride of gold may be drawn off into suitable troughs, N, and collected in any desired manner. The chloride thus obtained is afterward treated in any suitable manner for the purpose of obtaining the pure gold therefrom.

If desired, the ore in the vats may be a second time treated in the manner specified. After all the gold that can be made to unite with the chlorine has been extracted from the mass the vats are raised until they are quite free from the tubs, by means of the shafts C and drums P, the exhausted ore is removed, the vats are replaced, again filled with the ore, and the operation repeated.

The advantages of the invention consist in the cheap and simple form of apparatus required, the simplicity of the operation, the economy of material, and especially of labor, the organization being such that a large number of the vats may be kept in operation by a very few attendants, who need not be skilled.

I am aware that the herein-described process of chloridizing auriferous ores is not new, and this I do not claim, my invention consisting in the improved form, construction, and arrangement of apparatus by which this well-known process may be carried out.

I claim as my invention—

1. The bell-shaped vat A, formed with inlet-aperture *d* at its closed end, adapted to receive successive charges of ore, chlorine, air, and water, and an exit, *d'*, located in the side of the vat at a point above the water-seal, and provided with shield *p*, and the receiving-pan B, having outlet *m* and adapted to contain and seal the open end of the vat A, and when said vat is raised to receive and contain the entire charge for further treatment, substantially as set forth.

2. In an apparatus for chloridizing gold ore, the combination of an inverted air-tight vat, A, provided with an inlet-opening at its closed end, through which the ore, and afterward the chlorine, is charged, and an exit located near the bottom and in the side of said vat, and a receiving-pan adapted to contain and seal the lower end of the inverted vat, and when said vat is removed to receive and contain the entire charge for subsequent treatment, substantially as set forth.

3. In an apparatus for chloridizing gold ore, the combination, with the inverted air-tight vat A, formed with charging-aperture at its closed end, and an exit, *d'*, located in the side of the vat at a point above the water-seal, and provided with suitable protecting-shield, of the receiving-pan B, having suitable outlet, and adapted to contain and seal the open end of the vat A, and when said vat is raised to receive and contain the entire charge for further treatment, and mechanism for raising the vat, and thereby discharging its contents into the receiving-pan, substantially as described.

In testimony whereof I have hereunto subscribed my name this 28th day of January, A. D. 1884.

EDWARD P. THOMPSON.

Witnesses:
DANL. W. EDGECOMB,
CHARLES A. TERRY.